United States Patent
Miyake et al.

(10) Patent No.: US 11,952,549 B2
(45) Date of Patent: Apr. 9, 2024

(54) GREASE COMPOSITION AND ROLLING BEARING

(71) Applicants: JTEKT CORPORATION, Kariya (JP); ENEOS CORPORATION, Tokyo (JP)

(72) Inventors: Kazunori Miyake, Kitakatsuragi-gun (JP); Kiyomi Sakamoto, Tokyo (JP); Yusuke Ayame, Tokyo (JP); Go Tatsumi, Tokyo (JP)

(73) Assignees: JTEKT CORPORATION, Kariya (JP); ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/763,368

(22) PCT Filed: Sep. 23, 2020

(86) PCT No.: PCT/JP2020/035669
§ 371 (c)(1),
(2) Date: Mar. 24, 2022

(87) PCT Pub. No.: WO2021/060232
PCT Pub. Date: Apr. 1, 2021

(65) Prior Publication Data
US 2022/0348839 A1 Nov. 3, 2022

(30) Foreign Application Priority Data

Sep. 24, 2019 (JP) ................................ 2019-172914

(51) Int. Cl.
*C10M 169/02* (2006.01)
*C10M 115/08* (2006.01)
(Continued)

(52) U.S. Cl.
CPC ........ *C10M 169/02* (2013.01); *C10M 115/08* (2013.01); *F16C 33/6633* (2013.01);
(Continued)

(58) Field of Classification Search
CPC .............. C10M 115/08; C10M 169/02; C10M 2207/2835; C10M 2215/1026;
(Continued)

(56) References Cited

U.S. PATENT DOCUMENTS 5,846,916 A 12/1998 Akabe et al.
2006/0052257 A1 3/2006 Kinoshita et al.
(Continued)

FOREIGN PATENT DOCUMENTS

CN 101952401 A 1/2011
CN 103140578 A 6/2013
(Continued)

OTHER PUBLICATIONS

Aug. 30, 2022 Office Action issued in Chinese Patent Application No. 202080066911.8.
(Continued)

*Primary Examiner* — James C Goloboy
(74) *Attorney, Agent, or Firm* — Oliff PLC (57) ABSTRACT

Examples of the ester oil include diester oils such as dibutyl sebacate, dioctyl sebacate, di-2-ethylhexyl sebacate, dioctyl adipate, diisodecyl adipate, ditridecyl adipate, ditridecyl phthalate, and methyl acetyl ricinolate; aromatic ester oils such as trioctyl trimellitate, tridecyl trimellitate, and tetraoctyl pyromellitate; polyol ester oils such as trimethylolpropane caprylate, trimethylolpropane pelargonate, pentaerythritol-2-ethylhexanoate, and pentaerythritol pelargonate; carbonate oil; complex ester oil which is an oligoester of polyhydric alcohol and mixed fatty acid including dibasic acid and monobasic acid; etc.

5 Claims, 3 Drawing Sheets

(51) Int. Cl.
*C10N 30/06* (2006.01)
*C10N 40/02* (2006.01)
*C10N 50/10* (2006.01)
*F16C 33/66* (2006.01)

(52) U.S. Cl.
CPC .............. *C10M 2207/2835* (2013.01); *C10M 2215/1026* (2013.01); *C10N 2030/06* (2013.01); *C10N 2040/02* (2013.01); *C10N 2050/10* (2013.01)

(58) Field of Classification Search
CPC ............ C10N 2030/06; C10N 2040/02; C10N 2050/10; F16C 33/6633
See application file for complete search history.

(56) References Cited

U.S. PATENT DOCUMENTS

| | | | |
|---|---|---|---|
| 2007/0149422 A1* | 6/2007 | Miyajima | C10M 159/06 508/552 |
| 2013/0170777 A1 | 7/2013 | Ito et al. | |
| 2014/0254968 A1 | 9/2014 | Nakagawa et al. | |
| 2015/0045273 A1 | 2/2015 | Sekiguchi et al. | |
| 2017/0253826 A1 | 9/2017 | Suetsugu et al. | |
| 2018/0112147 A1* | 4/2018 | Miyake | C10M 169/02 |
| 2019/0055491 A1 | 2/2019 | Yoshinari et al. | |

FOREIGN PATENT DOCUMENTS

| | | |
|---|---|---|
| CN | 107974330 A | 5/2018 |
| DE | 11 2018 004 265 T5 | 5/2020 |
| EP | 2264132 A1 | 12/2010 |
| EP | 3 885 425 A1 | 9/2021 |
| JP | H01-268793 A | 10/1989 |
| JP | 2000-351983 A | 12/2000 |
| JP | 2004-301167 A | 10/2004 |
| JP | 2006-029473 A | 2/2006 |
| JP | 2006-298963 A | 11/2006 |
| JP | 2006-316081 A | 11/2006 |
| JP | 2007-078120 A | 3/2007 |
| JP | 2010-065171 A | 3/2010 |
| JP | 2013-035946 A | 2/2013 |
| JP | 2014-148632 A | 8/2014 |
| JP | 2019-052200 A | 4/2019 |
| WO | 2013-125510 A1 | 8/2013 |
| WO | 2015-182242 A1 | 12/2015 |
| WO | 2019/083022 A1 | 5/2019 |

OTHER PUBLICATIONS

Jul. 28, 2022 Office Action issued in German Patent Application No. 112020004507.2.
Nov. 17, 2020 International Search Report issued in International Patent Application No. PCT/JP2020/035669.
Nov. 17, 2020 Written Opinion issued in International Patent Application No. PCT/JP2020/035669.
Feb. 12, 2023 Office Action issued in Chinese Patent Application No. 202080066911.8.

* cited by examiner

GREASE COMPOSITION AND ROLLING BEARING

TECHNICAL FIELD

The present invention relates to a grease composition and a rolling bearing in which the grease composition is enclosed.

BACKGROUND ART

In recent years, demands for higher efficiency to be free from maintenance and to respond to power saving regulations have increased in three-phase motors. Therefore, a rolling bearing to be used in a motor is requested to achieve low torque performance and long-life performance compatibly.

For example, Patent Literature 1 has proposed a grease composition for use in a bearing for a motor. The grease composition contains a base oil including perfluoropolyether oil, a thickener including polytetrafluoroethylene, and silica as inorganic fine particles.

CITATION LIST

Patent Literature

Patent Literature 1: JP-A-2010-65171

SUMMARY OF INVENTION

Technical Problem

A grease composition for use in a bearing for a motor in the background art is not satisfactory in low torque performance when the grease composition is enclosed in a rolling bearing. There is room for improvement to achieve low torque performance.

In order to reduce torque in a rolling bearing in which grease is enclosed, it is regarded as effective to use grease containing, as a thickener, diurea using short-chain aliphatic amine as an amine component. However, when such grease containing diurea is used in a comparatively large rolling bearing, the grease (particularly its base oil) may leak outside the rolling bearing due to large shearing or centrifugal force applied to the grease. Such oil leakage may cause reduction in life of the bearing.

Therefore, a grease composition that can compatibly achieve low torque performance and grease leakage resistance, and a rolling bearing in which the grease composition is enclosed have been requested.

Solution to Problem

As a result of earnest studies to meet the aforementioned request, the present inventors found that a grease composition containing, as a thickener, a mixture of a plurality of kinds of diurea having predetermined structures can compatibly achieve low torque performance and grease leakage resistance. Thus, the present inventors completed the present invention.

A grease composition of the present invention is a grease composition including:
an ester base oil in an amount of 78 to 88 mass % based on a total amount of the grease composition; and
a thickener in an amount of 10 to 17 mass % based on the total amount of the grease composition,
in which the thickener contains diurea expressed by the following formula (1):

$$R^1\text{—NHCONH—}C_6H_4\text{—}CH_2\text{—}C_6H_4\text{—NHCONH—}R^2 \quad (1),$$

in which $R^1$ and $R^2$ each independently represents one of:
(A) an alicyclic group A expressed by $R^3$—$C_6H_{10}$— in which $R^3$ represents hydrogen, a 2-methyl group, a 3-methyl group, or a 4-methyl group; (B) an alkyl group B expressed by n-$C_mH_{2m+1}$ in which m represents an integer of 6 to 10; and (C) an alkyl group C expressed by n-$C_mH_{2m+1}$ in which m represents an integer of 16 to 20, and
in which the diurea is arranged so that the alicyclic group A is 5 to 35 mol %, a total of the alicyclic group A and the alkyl group B is 55 to 95 mol %, and the remainder is the alkyl group C, based on a total of $R^1$ and $R^2$.

The grease composition according to the present invention includes an ester oil as a base oil and a thickener, and the thickener contains diurea expressed by the aforementioned formula (1). Here, the diurea contains a plurality of kinds of diurea having predetermined chemical structures. Specifically, the thickener has a mixture of the following diurea (U1) to (U6) in a predetermined ratio.

(U1) Diurea having the aforementioned alicyclic group A at each of opposite terminals thereof.
(U2) Diurea having the aforementioned alicyclic group A at one of opposite terminals thereof and the aforementioned alkyl group B at the other terminal.
(U3) Diurea having the aforementioned alicyclic group A at one of opposite terminals thereof and the aforementioned alkyl group C at the other terminal.
(U4) Diurea having the aforementioned alkyl group B at each of opposite terminals thereof.
(U5) Diurea having the aforementioned alkyl group B at one of opposite terminals thereof and the aforementioned alkyl group C at the other terminal.
(U6) Diurea having the aforementioned alkyl group C at each of opposite terminals thereof.

The thickener in the grease composition according to the present invention contains the aforementioned diurea. Accordingly, when the grease composition is used as grease for a rolling bearing, it is possible to compatibly achieve the low torque performance and the grease leakage resistance.

This reason is assumed as follows.

The aforementioned grease composition contains, as a part of the thickener, diurea in which one or each of terminal functional groups ($R^1$ and $R^2$) is the alkyl group B (having 6 to 10 carbon atoms) which has a comparatively short chain. Due to the content of such diurea, the low torque performance can be secured.

On the other hand, in the case where the diurea, which is a component of the thickener, contains the diurea (aforementioned U4) in which both the terminal functional groups ($R^1$ and $R^2$) is the alkyl group B, the low torque performance is excellent, but the structure of diurea is uniform enough to make the thickener have a long fiber structure. When the thickener has a long fiber structure, the contact area between the thickener and the base oil is reduced so that the force with which the thickener can hold the base oil is reduced. Thus, the grease (base oil) enclosed in a rolling bearing tends to leak outside the rolling bearing.

On the contrary, as in the grease composition according to the present invention, by use of a thickener in which a plurality of kinds of diurea having different structures as to the terminal functional groups ($R^1$ and $R^2$) are mixed, fibers of the thickener do not grow, and the ratio of short fibers in the thickener increases. Particularly, when the thickener having the composition according to the present invention is used, the structure of the thickener can be micronized. When the structure of the thickener is micronized, the contact area between the thickener and the base oil increases to improve the force with which the thickener can hold the base oil. Thus, the grease (base oil) enclosed in a rolling bearing can be prevented from easily leaking outside the rolling bearing.

Due to the reason described above, it is estimated that the grease composition according to the present invention can compatibly achieve the low torque performance and the grease leakage resistance.

Preferably the aforementioned grease composition further contains 1 to 10 mass % of an additive based on a total amount of the grease composition. In this case, it is possible to further improve the performance of the grease composition while securing the low torque performance and the grease leakage resistance.

A rolling bearing according to the present invention is a rolling bearing in which the grease composition according to the present invention is enclosed.

Advantageous Effects of Invention

A grease composition according to the present invention can compatibly achieve low torque performance and grease leakage resistance when the grease composition is enclosed in a rolling bearing.

A rolling bearing according to the present invention is a rolling bearing in which the grease composition enclosed therein hardly leaks so that lubrication can be secured for a long time and low torque can be achieved.

DESCRIPTION OF EMBODIMENTS

An embodiment of the present invention will be described below with reference to the drawings.

A rolling bearing according to the present embodiment is a ball bearing in which grease including a grease composition according to an embodiment of the present invention is enclosed.

Figure 1:
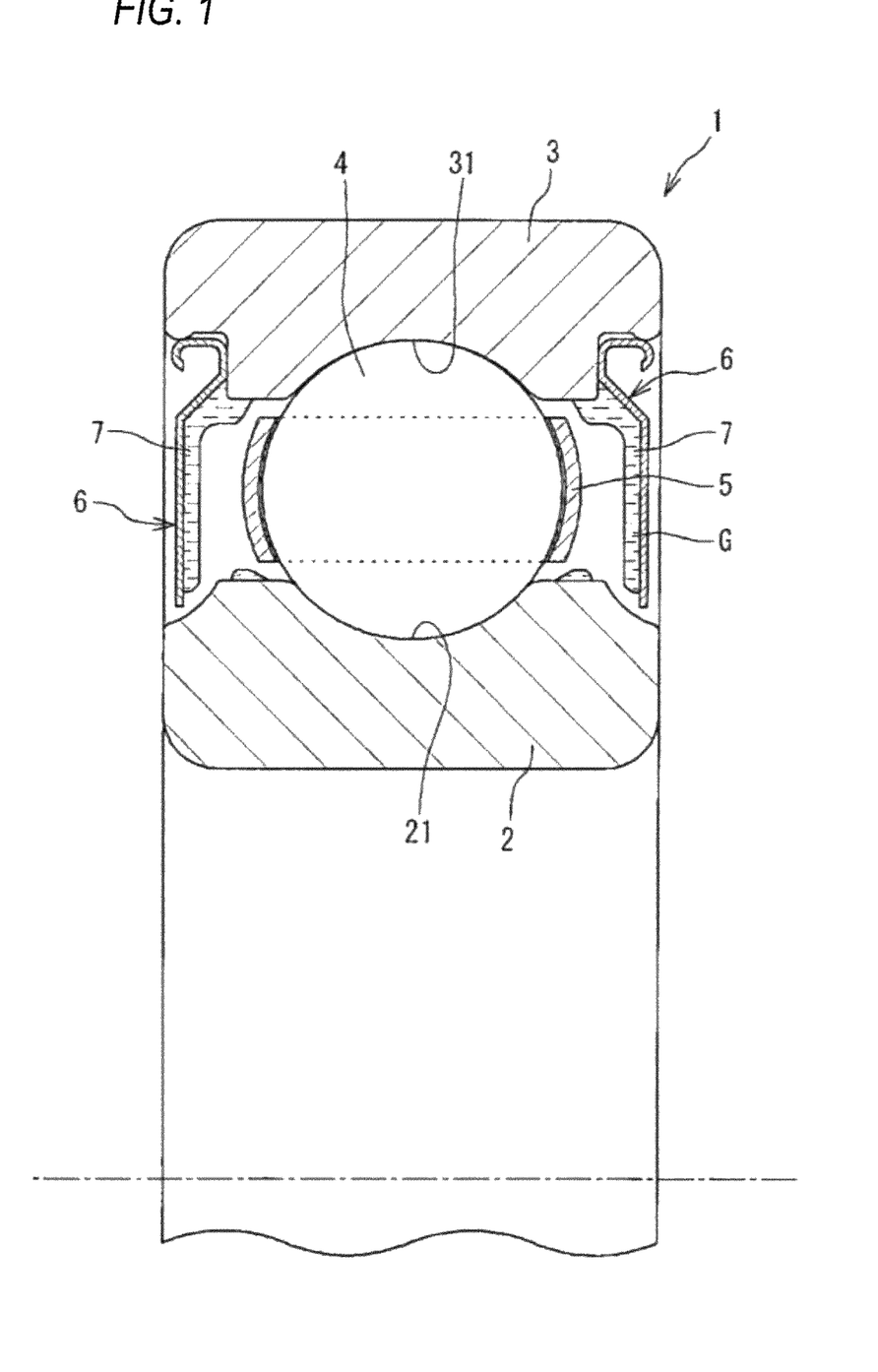
FIG. 1 is a sectional view illustrating a ball bearing according to an embodiment of the present invention.

FIG. 1 is a sectional view showing a ball bearing according to an embodiment of the present invention.

A ball bearing 1 has an inner ring 2, an outer ring 3 which is provided outside the inner ring 2 in a radially direction, a plurality of balls 4 which are provided between the inner ring 2 and the outer ring 3 so as to serve as rolling elements, and a cage 5 which has an annular shape and retains the balls 4. In addition, shield plates 6 having annular shape are provided axially on one side and the other side of the ball bearing 1 respectively.

Further, grease G including the grease composition according to the embodiment of the present invention is enclosed in an annular region 7 surrounded by the inner ring 2, the outer ring 3 and the two shield plates 6.

An inner raceway surface 21 where the balls 4 roll is formed in the outer circumference of the inner ring 2.

An outer raceway surface 31 where the balls 4 roll is formed in the inner circumference of the outer ring 3.

The plurality of balls 4 are put between the inner raceway surface 21 and the outer raceway surface 31 so as to roll on the inner raceway surface 21 and the outer raceway surface 31.

The grease G enclosed in the region 7 is also put at places where the balls 4 contact the inner raceway surface 21 of the inner ring 2 and places where the balls 4 contact the outer raceway surface 31 of the outer ring 3. Incidentally, the grease G is enclosed to occupy 20 to 40 volume % based on the volume of a space excluding the balls 4 and the cage 5 from the space surrounded by the inner ring 2, the outer ring 3 and the two shield plates 6.

Each shield plate 6 is an annular member which is made of a galvanized steel sheet coated with lithium silicate. The shield plate 6 is attached to the outer ring 3 so that an outer circumferential part (radially outside part) of the shield plate 6 is fitted to the inner circumferential surface of the outer ring 3. On the other hand, an inner circumferential part (radially inside part) of the shield plate 6 faces the outer circumferential surface of the inner ring 2 so as to have a slight space therefrom. A labyrinth seal is constituted by the inner circumferential part. The shield plate 6 prevents the enclosed grease G from leaking outside.

The grease including a grease composition according to the embodiment of the present invention, which will be described later, is enclosed as the grease G in the ball bearing 1 thus configured. It is therefore possible to secure the low bearing rotational torque for a long time without causing grease leakage (oil leakage).

Next, the grease composition constituting the grease G will be described in detail.

The grease composition constituting the grease G is a grease composition according to the embodiment of the present invention, which contains at least a base oil and a thickener.

One of technical features of the aforementioned grease composition is to contain a predetermined amount of a specified thickener. Due to the technical feature, it is possible to show the aforementioned excellent effect.

The aforementioned base oil in the aforementioned grease composition is an ester oil.

The grease G whose base oil is an ester oil can be easily adsorbed on a metal surface due to high polarity of the ester oil. Thus, an oil film can be formed easily. In addition, as another advantage, for example, the grease G can suppress evaporation of the base oil without increasing the viscosity.

Examples of the ester oil include diester oils such as dibutyl sebacate, dioctyl sebacate, di-2-ethylhexyl sebacate, dioctyl adipate, diisodecyl adipate, ditridecyl adipate, ditridecyl thalate, and methyl acetyl cinolate; aromatic ester oils such as trioctyl trimellitate, tridecyl trimellitate, and tetraoctyl pyromellitate; polyol ester oils such as trimethylolpropane caprylate, trimethylolpropane belargonate, pentaerythritol-2-ethylhexanoate, and pentaerythritol belargonate; carbonate oil; complex ester oil which is an oligoester of polyhydric alcohol and mixed fatty acid including dibasic acid and monobasic acid; etc.

Each of those ester oils may be used alone, or two or more kinds of them may be used together.

The kinematic viscosity of the base oil at 40° C. is preferably 20 to 30 mm$^2$/s.

In addition, the kinematic viscosity of the base oil at 100° C. is preferably 2 to 7 mm$^2$/s.

When the grease composition containing the base oil having such kinematic viscosity is enclosed in the rolling bearing, the grease composition does not cause oil leakage easily, and is suited to achievement of low torque.

The kinematic viscosity is a value according to JIS K 2283 (2000).

The content of the base oil is from 78 to 88 mass % based on the total amount of the grease composition. When the content of the base oil is less than 78 mass %, the content of the thickener increases relatively to cure the grease G more than necessity. Thus, it may be difficult to secure the low torque performance. On the other hand, when the content of the base oil exceeds 88 mass %, the ratio of the base oil in the grease composition increases so that oil leakage tends to occur when the grease composition is enclosed in the rolling bearing.

The grease composition contains diurea expressed by the following formula (1) as the thickener.

$$R^1\text{—NHCONH—}C_6H_4\text{—}CH_2\text{—}C_6H_4\text{—NHCONH—}R^2, \quad (1)$$

in the formula, $R^1$ and $R^2$ each independently represents one of (A) an alicyclic group A expressed by $R^3\text{—}C_6H_{10}\text{—}$ ($R^3$ represents hydrogen, a 2-methyl group, a 3-methyl group, or a 4-methyl group), (B) an alkyl group B expressed by n-$C_mH_{2m+1}$ (m represents an integer of 6 to 10), and (C) an alkyl group C expressed by n-$C_mH_{2m+1}$ (m represents an integer of 16 to 20).

Accordingly, in the aforementioned formula (1), the alicyclic group A is selected from a cyclohexyl group, a 2-methylcyclohexyl group, a 3-methylcyclohexyl group, and a 4-methylcyclohexyl group.

The alkyl group B is selected from a hexyl group, a heptyl group, an octyl group, a nonyl group, and a decyl group.

The alkyl group C is selected from a hexadecyl group, a heptadecyl group, an octadecyl group, a nonadecyl group, and an icosyl group.

The thickener contains a plurality of kinds of diurea expressed by the formula (1) as described above.

On this occasion, the plurality of kinds of diurea are arranged so that the alicyclic group A is 5 to 35 mol %, the total of the alicyclic group A and the alkyl group B is 55 to 95 mol %, and the remainder is the alkyl group C, based on the total of $R^1$ and $R^2$.

The thickener satisfying such a configuration has a minute fiber structure. The grease composition containing the thickener is suited to compatible achievement of the low torque performance and the grease leakage resistance.

In the thickener, the alkyl group B is preferably 50 mol % or higher based on the total of $R^1$ and $R^2$. In this case, the low torque performance of the grease composition is more improved.

In the diurea expressed by the formula (1), the functional group "—$C_6H_4$—$CH_2$—$C_6H_4$—" between the two urea bonds preferably includes two phenylene groups bonded at para positions.

The diurea contained in the grease composition is a reactant between a diisocyanate compound and a mixture of a plurality of kinds of amine compounds (hereinafter also referred to as amine mixture).

Examples of the diisocyanate compound include 4,4'-diphenylmethane diisocyanate (4,4'-MDI), 2,4'-diphenylmethane diisocyanate (2,4'-MDI), and 2,2'-diphenylmethane diisocyanate (2,2'-MDI).

The amine mixture is a mixture of (a) an alicyclic amine, (b) an aliphatic amine having 6 to 10 carbon atoms, and (c) an aliphatic amine having 16 to 20 carbon atoms. In the amine mixture, the content of the component (a) is 5 to 35 mol %, the total content of the component (a) and the component (b) is 55 to 95 mol %, and the remainder is the component (c).

The content of the component (b) is preferably 50 mol % or higher.

The alicyclic amine (a) can be selected from a cyclohexylamine, a 1-amino-2-methylcyclohexane, a 1-amino-3-methylcyclohexane, and an 1-amino-4-methylcyclohexane.

Among them, the cyclohexylamine is preferred.

The aliphatic amine (b) having 6 to 10 carbon atoms can be selected from an 1-aminohexane (having 6 carbon atoms), an 1-aminoheptane (having 7 carbon atoms), an 1-aminooctane (having 8 carbon atoms), an 1-aminonane (having 9 carbon atoms), and an 1-aminodecane (having 10 carbon atoms).

Among them, the 1-aminooctane is preferred.

The aliphatic amine (c) having 16 to 20 carbon atoms can be selected from an 1-aminohexadecane (having 16 carbon atoms), an 1-aminoheptadecane (having 17 carbon atoms), an 1-aminooctadecane (having 18 carbon atoms), an 1-aminononadecane (having 19 carbon atoms), and an 1-aminoicosane (having 20 carbon atoms).

Among them, the 1-aminooctadecane is preferred.

In order to obtain the aforementioned diurea, the diisocyanate compound and the amine mixture can be reacted under various conditions. The diisocyanate compound and the amine mixture are preferably reacted in the base oil to obtain diurea with high homogeneous dispersibility as the thickener.

In addition, the reaction between the diisocyanate compound and the amine mixture may be carried out by adding the base oil in which the diisocyanate compound is dissolved to the base oil in which the amine mixture is dissolved, or by adding the base oil in which the amine mixture is dissolved to the base oil in which the diisocyanate compound is dissolved.

The temperature and time in the reaction between the amine mixture and the diisocyanate compound are not particularly limited but may be the same as conditions used ordinarily to obtain diurea constituting a grease composition.

The reaction temperature is preferably from 60° C. to 170° C. from the viewpoint of solubility and volatility of the diisocyanate compound and amine compounds included in the amine mixture.

The reaction time is preferably from 0.5 to 2.0 hours from the viewpoint of completing the reaction between the diisocyanate compound and the amine compounds included in the amine mixture and shortening the production time to manufacture the grease efficiently.

The content of the thickener is from 10 to 17 mass % based on the total amount of the grease composition.

When the content of the thickener is less than 10 mass %, the ability with which the thickener can hold the base oil is low. In this case, the amount of the base oil released during the rotation of the rolling bearing increases so that oil leakage from the rolling bearing tends to occur. On the other hand, when the content of the thickener exceeds 17 mass %, relative motion may occur among the inner ring, the outer ring, the balls and the cage due to the rotation of the rolling bearing so that stirring resistance caused by shearing of the grease G may increase to increase the torque of the rolling bearing.

The grease composition may contain additives as optional components.

Examples of the additives include an antioxidant, an extreme pressure agent, an oily agent, a rust inhibitor, an antiwear agent, a dye, a color stabilizer, a tackiness agent, a structure stabilizer, a metal deactivator, a viscosity index improver, and a detergent.

The content of the additives is preferably 1 to 10 mass % based on the total amount of the grease composition.

Preferably the grease composition contains at least the antioxidant as the additive. Due to the antioxidant contained in the grease composition, a lubrication life of the grease G can be improved.

An antioxidant known in the background art such as an amine-based antioxidant or a phenol-based antioxidant may be used as the aforementioned antioxidant.

The grease composition may be manufactured by a method known in the background art.

For example, as described above, the grease composition may be manufactured in such a manner that the base oil in which the diisocyanate compound is dissolved and the base oil in which the amine compounds are dissolved are mixed to react diisocyanate compound with amine compound, and optional additives are further thrown therein during the reaction or at a desired timing after the reaction.

According to the embodiment, a composition containing a predetermined thickener is used as the grease composition constituting the grease G enclosed in the ball bearing 1. Therefore, in the ball bearing 1, as described above, the enclosed grease G is prevented from easily leaking so that lubrication can be secured for a long time, and low torque can be achieved.

The present invention is not limited to the aforementioned embodiment, but may be carried out by another embodiment.

The rolling bearing according to the embodiment of the present invention is not limited to the ball bearing in which the grease including the grease composition according to the embodiment of the present invention is enclosed. The rolling bearing may be another rolling bearing such as a roller bearing in which other rolling elements than the balls are used, as long as the grease including the grease composition according to the embodiment of the present invention is enclosed therein.

EXAMPLE

Next, the present invention will be described further in detail based on examples. However, the present invention is not limited only to the examples.

Examples 1 to 6 and Comparative Examples 1 to 9

Here, a plurality of grease compositions was prepared, and each of the grease compositions was evaluated. Components of the grease compositions are shown in Table 1, and their evaluation results are shown in Table 1, and FIGS. 2 and 3.

(Raw Materials of Grease Composition)
(1) Base Oil
Base oil A: ester oil
Polyol ester (kinematic viscosity (40° C.)=25 mm$^2$/s, kinematic viscosity (100° C.)=4.9 mm$^2$/s)
Base oil B: mixed oil of poly-α-olefin and ester oil
Poly-α-olefin (kinematic viscosity (40° C.)=30 mm$^2$/s, kinematic viscosity (100° C.)=5.9 mm$^2$/s)
Ester oil (kinematic viscosity (40° C.)=30 mm$^2$/s, kinematic viscosity (100° C.)=5.4 mm$^2$/s)

Mixing ratio (based on weight): poly-α-olefin/ester oil=80/20

(2) Thickener-Diurea (Reactant Between Diisocyanate and Amine Compounds)

(2-1) Diisocyanate
4,4'-diphenylmethane diisocyanate (4,4'-MDI)

(2-2) Amine Compounds
(a) Cyclohexylamine
(b) 1-aminooctane
(c) 1-aminooctadecane (3) Additives
Amine-based antioxidant, phenol-based antioxidant (Preparation of Grease)

Greases including the grease compositions having the components shown in Table 1 were prepared through the following steps as greases of Examples and Comparative Examples.

(1) 4,4'-MDI, cyclohexylamine, 1-aminooctane and 1-aminooctadecane are measured so that the total of cyclohexylamine, 1-aminooctane and 1-aminooctadecane reaches 100 mol % relative to 50 mol % of 4,4'-MDI.

(2) Half the amount of the base oil whose content will be 84 mass % based on the total amount of the grease composition and the amount of 4,4'-MDI with which the content of the thickener after reaction will be 14 mass % based on the total amount of the grease composition are thrown into a stainless vessel A, and heated to 60° C. to be thereby dissolved.

(3) Half the amount of the base oil whose content will be 84 mass % based on the total amount of the grease composition and the amount of cyclohexylamine, 1-aminooctane and 1-aminooctadecane with which the content of the thickener after reaction will be 14 mass % based on the total amount of the grease composition are thrown into another stainless vessel B, and heated to 80° C. to be thereby dissolved.

(4) The amine mixture solution in the stainless vessel B is dropped into the stainless vessel A so as to be thrown into the isocyanate solution.

(5) After it is confirmed that the whole amount of the amine mixture solution in the stainless vessel B has been thrown into the stainless vessel A, the solution in the stainless vessel A is heated to 150° C.

(6) The solution in the stainless vessel A is stirred while being heated and the temperature thereof is kept at 150° C. for 30 minutes.

(7) Heating is stopped, and the amount of the amine-based antioxidant and the phenol-based antioxidant whose content will be 1 mass % based on the total amount of the grease composition is thrown and cooled while being stirred.

(8) After that, homogenizing treatment is performed with a three-roll mill.

Through the steps (1) to (8), each grease was prepared.

(Evaluation of Grease)

Each grease according to Examples and Comparative Examples was evaluated as to (1) bearing rotational torque and (2) the amount of oil leakage. Results are shown in Table 1, and FIGS. 2 and 3.

TABLE 1

| | | Examples 1 | 2 | 3 | 4 | 5 | 6 | Comparative Examples 1 | Comparative Examples 2 | 3 | 4 | 5 | 6 | 7 | 8 | 9 |
|---|---|---|---|---|---|---|---|---|---|---|---|---|---|---|---|---|
| base oil | type | base oil A (ester oil) | | | | | | | base oil A (ester oil) | | | | | | | base oil B |
| | content based on total amount of grease composition | 84 mass % | | | | | | | 84 mass % | | | | | | | |
| thickener | type | R$^1$—NHCONH—C$_6$H$_4$—CH$_2$—C$_6$H$_4$—NHCONH—R$^2$ (NH and CH$_2$ were disposed at first and fourth positions relative to C$_6$H$_4$) | | | | | | | R$^1$—NHCONH—C$_6$H$_4$—CH$_2$—C$_6$H$_4$—NHCONH—R$^2$ (NH and CH$_2$ were disposed at first and fourth positions relative to C$_6$H$_4$) | | | | | | | |
| | —NHCONHC$_6$H$_4$—CH$_2$—C$_6$H$_4$—NHCONH— (mol %) (NH and CH$_2$ were disposed at first and fourth positions relative to C$_6$H$_4$)* | 50 | | | | | | | 50 | | | | | | | |
| | R$_1$ + R$_2$* (a) cyclohexyl group (mol %) | 10 | 10 | 20 | 30 | 30 | 10 | 0 | 10 | 10 | 20 | 30 | 10 | 30 | 100 | 10 |
| | (b) octyl group (mol %) | 60 | 70 | 60 | 60 | 50 | 50 | 100 | 40 | 30 | 20 | 0 | 90 | 70 | 0 | 90 |
| | (c) octadecyl group (mol %) | 30 | 20 | 20 | 10 | 20 | 40 | 0 | 50 | 60 | 60 | 70 | 0 | 0 | 0 | 0 |
| | content based on total amount of grease composition | 14 mass % | | | | | | | 14 mass % | | | | | | | |
| additive | type (content based on total amount of grease composition) | amine-based antioxidant (1 mass %), phenol-based antioxidant (1 mass %) | | | | | | | amine-based antioxidant (1 mass %), phenol-based antioxidant (1 mass %) | | | | | | | |
| evaluation | bearing rotational torque (mN·m) | 7.3 | 8.8 | 9.0 | 8.6 | 8.7 | 10.3 | 6.8 | 14.3 | 17.7 | 15.6 | 18.4 | 12.9 | 16.4 | 19.1 | 28.2 |
| | amount of oil leakage (%) | 3.3 | 3.9 | 3.1 | 4.5 | 5.7 | 5.8 | 19.5 | 6.0 | 8.0 | 4.2 | 5.9 | 9.9 | 15.6 | — | — |

*mol % of each functional group when total of R1 and R2 is 100 mol %

Evaluations shown in Table 1 were performed by the following evaluation methods respectively.

(1) Bearing Rotational Torque

The bearing rotational torque of each grease prepared in Examples and Comparative Examples was measured with a rotational torque tester according to the following conditions of Table 2.

Here, 0.83 g of each grease prepared in Examples and Comparative Examples was enclosed in 62022RU (with non-contact seals on both sides) which was a test bearing. On this occasion, the amount of the enclosed grease reached 40 volume % relative to the volume of a space excluding balls and a cage from a space surrounded by an inner ring, an outer ring and the seals.

Test bearings (two) thus prepared were inserted to the tester and rotated preliminarily at 1,800 min$^{-1}$ for 60 seconds. After that, the test bearings were allowed to stand still for 60 seconds, and rotated at 1,800 min$^{-1}$ for 1,800 seconds. An average value of torque for the last 60 seconds was regarded as bearing rotational torque. Results are shown in Table 1 and FIG. 2 (results of Comparative Examples 8 and 9 are shown in only Table 1).

Figure 2:
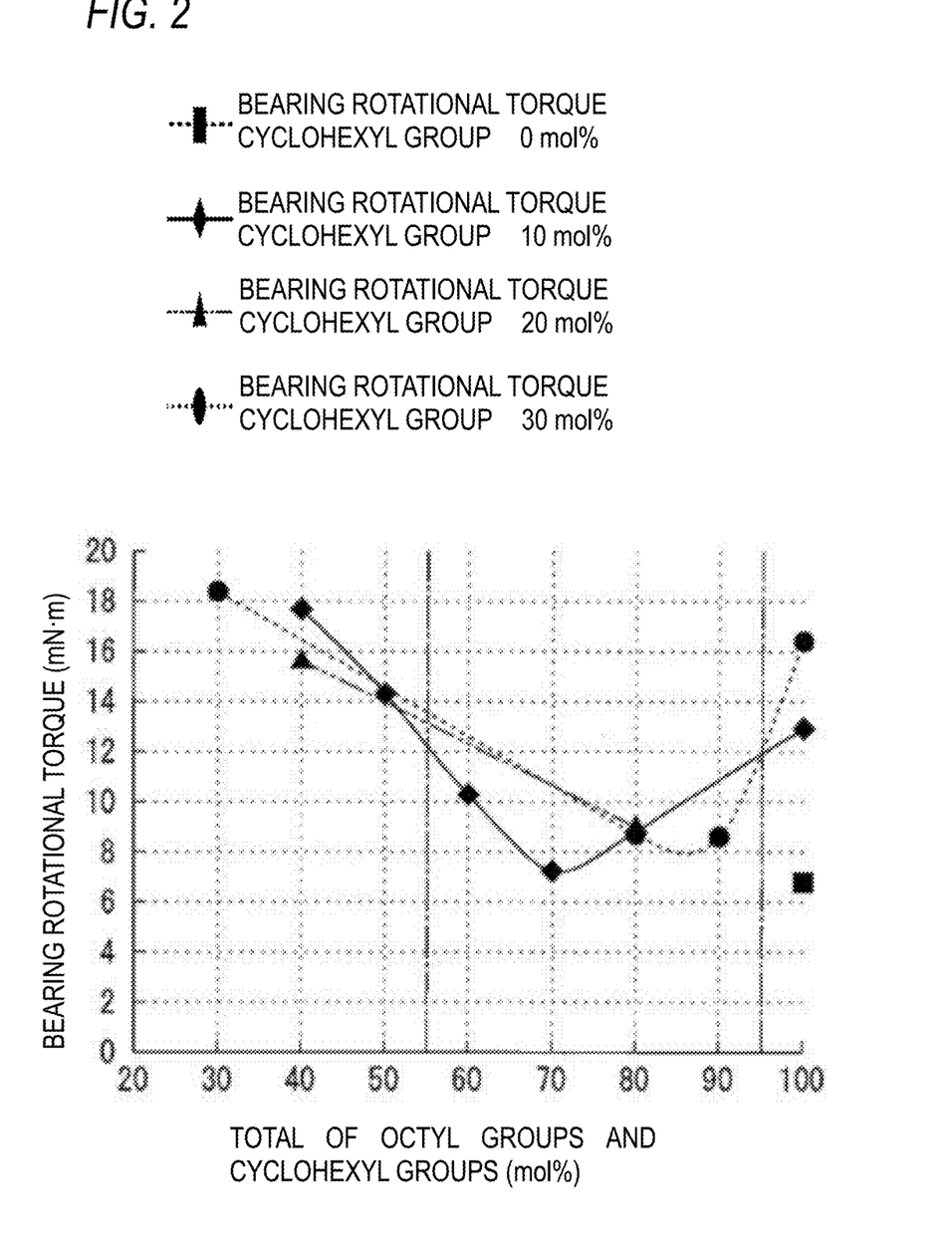
FIG. 2 is a graph showing evaluation results about bearing rotational torque with each grease prepared according to Examples and Comparative Examples.

FIG. 2 shows evaluation results about bearing rotational torque with each grease prepared in Examples and Comparative Examples. In the graph of FIG. 2, where the ordinate designates bearing rotational torque and the abscissa designates a total mol % of octyl groups and cyclohexyl groups, plotting is made every mol % of cyclohexyl groups.

Incidentally, the rotational torque shown as a result is a rotation torque corresponding to two test bearings.

In addition, in this evaluation, when the rotational toque corresponding to the two test bearings is 14 mN-m or less, the low torque performance can be regarded as good.

TABLE 2

| | conditions |
|---|---|
| test bearing (model number) | 62022RU |
| enclosed grease amount | 0.83 g |
| axial load | 77N |
| surface pressure (calculated) | 0.93 GPa |
| rotational speed | 1,800 min$^{-1}$ |
| atmosphere temperature | 25° C. (room temperature) |
| duration | 1,800 s (preliminary rotation 60 s) |
| measurement | rotational torque (average value for last 60 s) |

(2) Amount of Oil Leakage

Oil leakage was measured with a radial type grease performance tester according to the following conditions of Table 3.

Here, 8.2 g of each grease prepared in Examples and Comparative Examples was enclosed in 6309ZZ (with shield plates on both sides) which was a test bearing. On this occasion, the amount of the enclosed grease reached 20 volume % relative to the volume of a space excluding balls and a cage from a space surrounded by an inner ring, an outer ring and the shield plates.

Test bearings (two) thus prepared were inserted to the tester, heated and kept at 150° C. in outer ring temperature, and rotated at 6,000 min$^{-1}$ for 15 hours.

The weight of the test bearings was measured before and after the test with the grease performance tester, and a weight reduction ratio after the test <([bearing weight before test−bearing weight after test](g)/[enclosed grease amount (8.2 g)])×100(%)> was calculated to evaluate the amount of oil leakage. Results are shown in Table 1 and FIG. 3.

Figure 3:
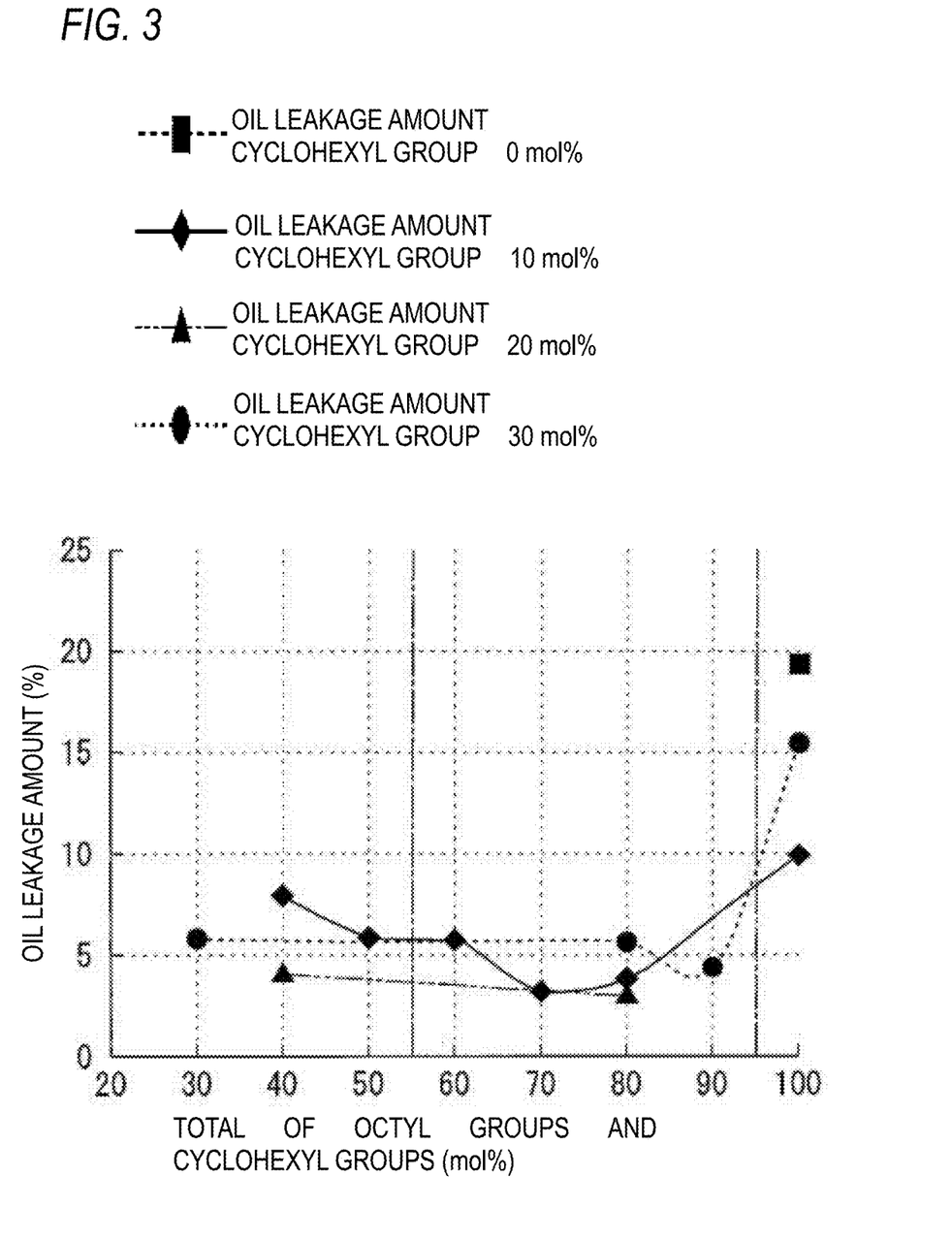
FIG. 3 is a graph showing results of oil leakage amount evaluated in each grease prepared according to the Examples and the Comparative Examples.

FIG. 3 is a graph showing the results of oil leakage amount evaluated in each grease prepared in Examples and Comparative Examples. In the graph of FIG. 3, where the ordinate designates the amount of oil leakage and the abscissa designates a total mol % of octyl groups and cyclohexyl groups, plotting is made every mol % of cyclohexyl groups.

In this evaluation, the grease leakage resistance can be regarded as good when the oil leakage amount is 9% or less.

TABLE 3

|  | conditions |
| --- | --- |
| test bearing (model number) | 6309ZZ |
| enclosed grease amount | 8.2 g |
| radial load | 0.925 kN |
| axial load | 0.151 kN |
| rotational speed | 6,000 min−1 |
| outer ring temperature | 150° C. |
| duration | 15 h |
| measurement | oil leakage amount (change in bearing weight) |

As shown in Table 1, and FIGS. 2 and 3, the low torque performance and the grease leakage resistance can be compatibly achieved by the grease composition according to the embodiment of the present invention.

The present application was based on a Japanese patent application (Japanese Patent Application No. 2019-172914) filed on Sep. 24, 2019, the contents of which are incorporated herein by reference.

1: ball bearing, 2: inner ring, 3: outer ring, 4: ball, 5: cage, 6: shield plate, 7: region, G: grease

The invention claimed is:

1. A grease composition comprising:
an ester base oil in an amount of 78 to 88 mass % based on a total amount of the grease composition; and
a thickener in an amount of 10 to 17 mass % based on the total amount of the grease composition,
wherein the thickener contains diurea expressed by the following formula (1):

(1), in which R$^1$ and R$^2$ each independently represents one of: (A) a cyclohexyl group; (B) an octyl group; and (C) an octadecyl group, and
wherein the diurea is arranged so that the cyclohexyl group (A) is 5 to 35 mol %, the octyl group (B) is 50 mol % or higher, a total of the cyclohexyl group (A) and octyl group (B) is 55 to 95 mol %, and the remainder is the octadecyl group (C), based on a total of R$^1$ and R$^2$,
wherein the grease composition has a bearing rotational torque corresponding to two test ball bearings of 14 mN-m or less, when the grease composition was enclosed in 6202 which is the ball bearing having an inner ring, an outer ring and a plurality of balls, a cage and two non-contact seals, the amount of the enclosed grease reached 40 volume % relative to the volume of a space excluding the balls and the cage from a space surrounded by the inner ring, the outer ring and the seals, and wherein the grease exhibits an oil leakage of 9% or less when enclosed in a 6309ZZ test bearing, the amount of the enclosed grease reaching 20% by volume relative to the volume of a space excluding balls and a cage from a space surrounded by an inner ring, outer ring and shield plates, and the test bearing rotated at 6,000 min$^{-1}$ at 150° C. in outer ring temperature for 15 hours.

2. The grease composition according to claim 1, further comprising an additive in an amount of 1 to 10 mass % based on the total amount of the grease composition.

3. A rolling bearing in which the grease composition according to claim 1 is enclosed.

4. A rolling bearing in which the grease composition according to claim 2 is enclosed.

5. The grease composition according to claim 1, wherein the cyclohexyl group (A) is 10 to 30 mol %, the octyl group (B) is 50 to 70 mol %, and the octadecyl group (C) is 10 to 40 mol %.

* * * * *